Patented July 2, 1940

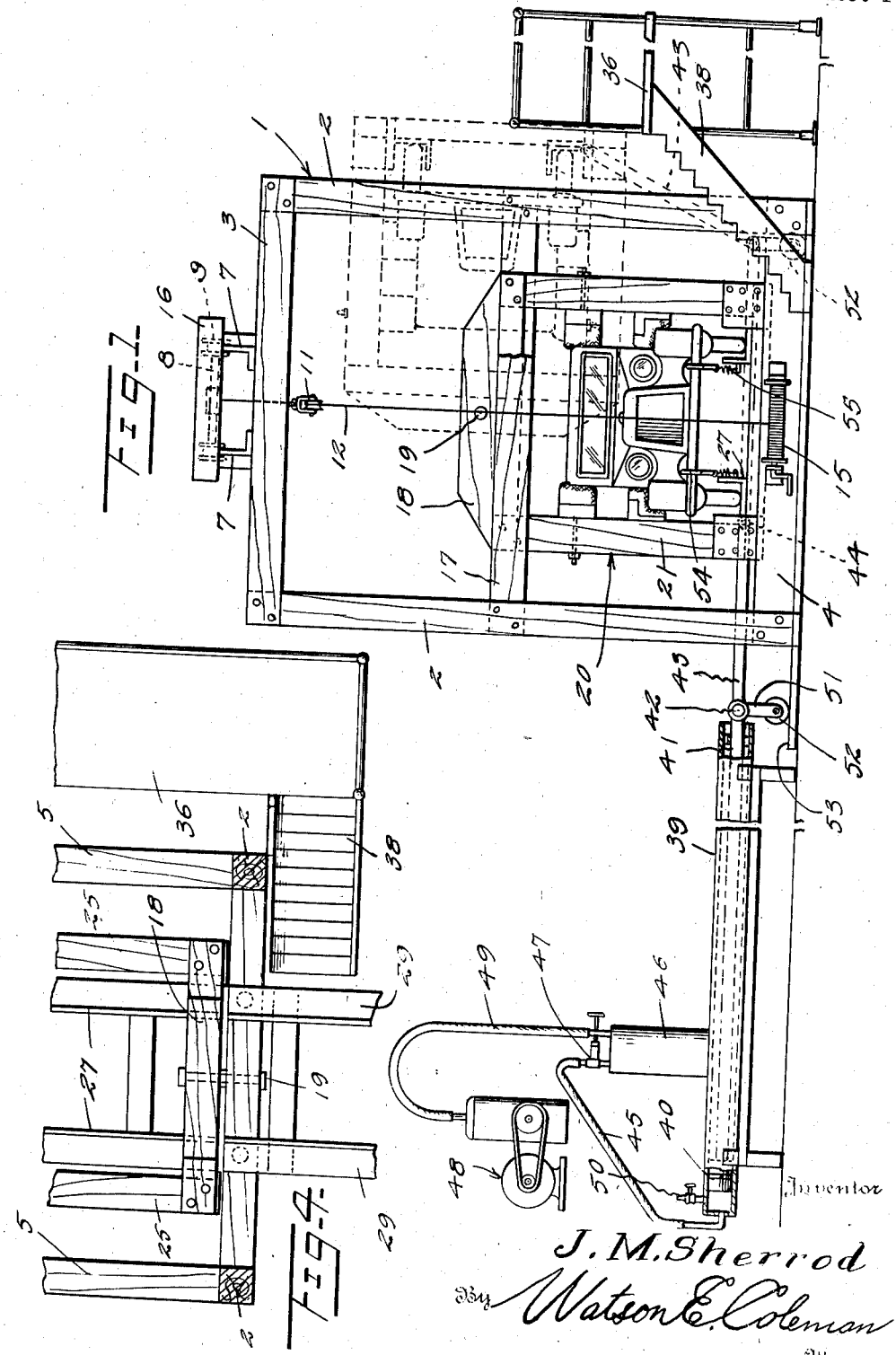

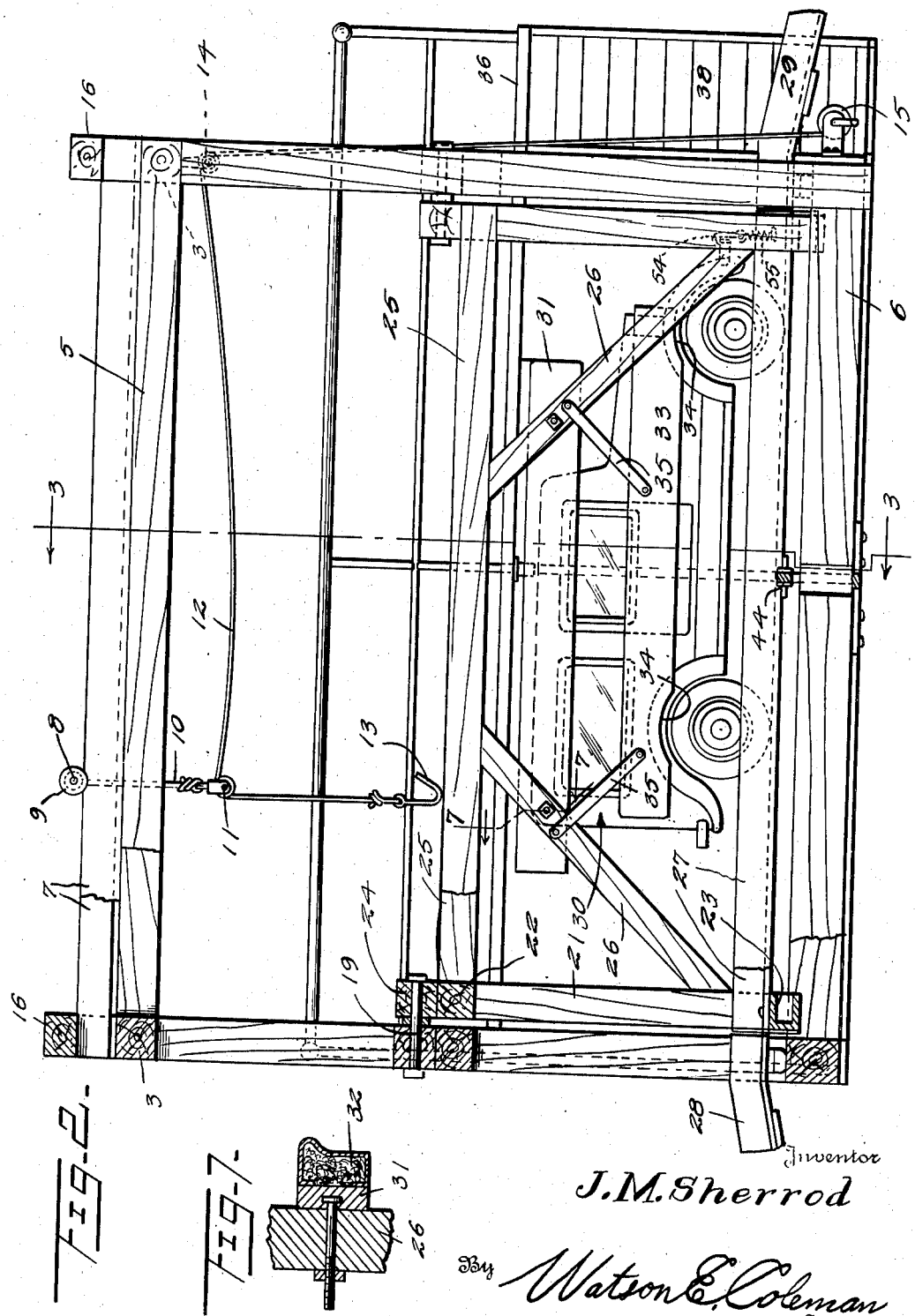

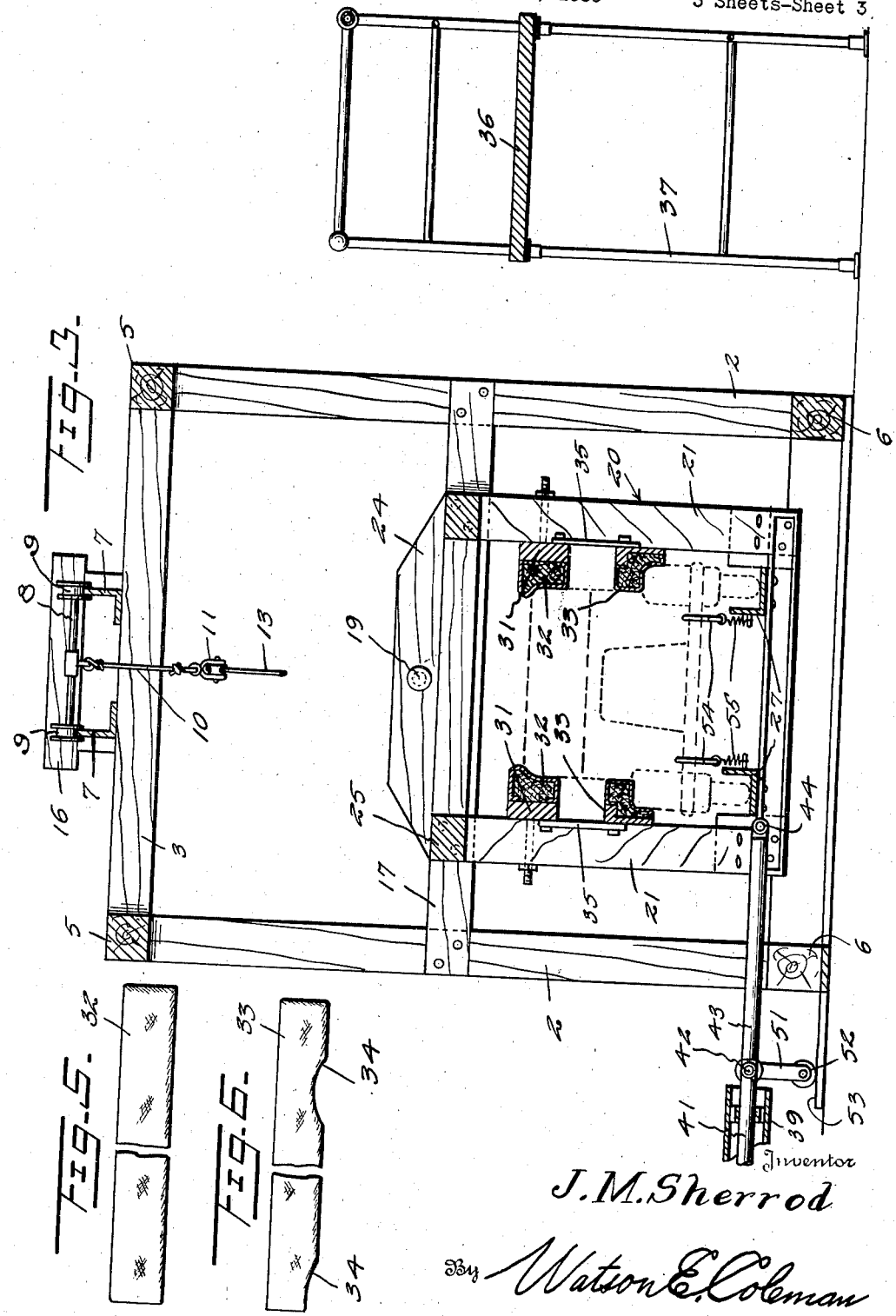

2,206,791

UNITED STATES PATENT OFFICE 2,206,791

VEHICLE HANDLING STRUCTURE

James M. Sherrod, Memphis, Tenn., assignor of one-half to William O. Speight, Memphis, Tenn.

Application September 21, 1939, Serial No. 295,978

5 Claims. (Cl. 214—1)

This invention relates generally to the class of lift devices and pertains particularly to a lift mechanism designed for the handling of motor vehicles.

The primary object of the present invention is to provide a motor vehicle lift structure by means of which a vehicle may be simultaneously raised and oscillated through approximately an arc of 90° whereby mechanics may conveniently work upon the mechanism of the engine, chassis or other under parts of the machine, while standing.

Another object of the present invention is to provide a car handling mechanism in which the car or motor vehicle is rocked in a cradle to a position where it is substantially resting upon its side, so that the entire under side of the vehicle is exposed to the view of mechanics standing at the side of the cradle in which the machine is supported, thereby enabling the mechanics to conveniently reach parts beneath the machine.

A further object is to provide a machine handling or lifting mechanism of the character stated in which novel means is employed for bracing the machine in the oscillating carriage whereby damage to the body of the machine is avoided.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in end elevation of the structure embodying the present invention, showing a motor vehicle in position in the cradle, the approach ramps having been removed.

Fig. 2 is a view in side elevation of the structure as shown in Fig. 1.

Fig. 3 is a sectional view on the line 3—3 of Fig. 2, the motor vehicle being indicated in dotted outline.

Fig. 4 is a view in top plan of a portion of the approach end of the structure.

Fig. 5 is a view in elevation of one of the body pads carried by the cradle.

Fig. 6 is a view in elevation of another or lower one of the body pads carried by the cradle.

Fig. 7 is a sectional view on the line 7—7 of Fig. 2.

Referring now more particularly to the drawings, the numeral 1 generally designates a fixed rectangular frame structure which comprises vertical corner standards or posts 2 which are connected together by top and bottom transverse beams 3 and 4, respectively, and top and bottom longitudinal beams 5 and 6, respectively, thus making the fixed frame structure in the form of an elongated rectangular box-like frame.

Extending longitudinally of the top of the frame and resting upon the top end beams 3, are spaced parallel angle beams 7 forming tracks for an overhead crane consisting of an axle 8 and a pair of flanged wheels 9, each of which rests upon a track 7 with the axle extending between the wheels. Depending from the central part of the axle 8 is a hanger 10 which supports a pulley 11, and over this pulley passes a cable 12 which at one end supports a hook 13. This cable passes from the pulley 11 to and through a pulley 14 which is suspended from a transverse top beam 3 at the front end of the frame and passes downwardly to a winch 15 about which it is wound. At either end of the pair of tracks is a stop beam 16 which is supported upon and extends across the tracks and prevents the crane unit from running off of the ends of the tracks.

At each end of the frame structure there is secured between the adjacent upright corner posts 2, substantially midway between their ends, a hanger beam 17 upon the top of which is supported a bearing block 18. Extending through each bearing block is a stub shaft 19 which extends longitudinally of the frame and these stub shafts are in alinement longitudinally of the frame and disposed upon the longitudinal center thereof.

Disposed within the frame structure is a cradle which is indicated generally by the numeral 20 and which comprises two vertically arranged rectangular end frames, each consisting of a pair of vertical posts 21 connected at their upper and lower ends by the cross beams 22 and 23, respectively. The upper cross beams 22 of the cradle carry bearing blocks 24 which correspond with the blocks 18 and which have the stub axles 19 passed therethrough, as shown in Fig. 2, whereby the cradle is oscillatably suspended within the frame for lateral swinging movement.

The end frames of the cradle structure are connected at their top ends by longitudinally extending side beams 25 and these are coupled with the lower parts of the adjacent posts 21 by angle brace beams 26.

The lower transverse beams 23 of the cradle are connected together longitudinally of the structure by a pair of tracks 27 which are formed of angle material, as shown in Fig. 1. These tracks are arranged so that the horizontal flanges of the angles will extend from the vertical flanges toward the sides of the cradle, thus placing the backs of the vertical flanges together, as shown in Fig. 1, whereby they will be disposed at the inner sides of the wheels of the vehicle when the wheels are run onto the tracks.

The end frames of the cradle 20 are of sufficient height and width to permit a motor vehicle to be driven therethrough onto the tracks 27 and to accomplish this there are disposed at the front and rear ends of the frame the approach and exit ramps 28 and 29, respectively, which, when the cradle is suspended in normal position, aline with the tracks 27, as shown in Fig. 4, so that a vehicle may be driven over the approach ramps onto the tracks 27 into the position in which the vehicle indicated generally by the numeral 30 is shown in Figs. 1 and 2.

Supported upon the pair of angle brace beams 26 at each side of the cradle is a buffer pad consisting of a bar 31, the inner face of which is provided with a relatively thick heavy padding 32, as shown in Fig. 7. These bars 31 are secured in a suitable manner horizontally to the inner sides of the brace beams 26 and near the top of the cradle, so that they will engage the top corners of the body of a motor vehicle when the latter is driven onto the cradle tracks.

The numeral 33 designates a removable pad structure which is disposed upon each side of the cradle beneath the fixed buffer pads. This pad structure 33 is in the nature of a bracing and locking means for the vehicle and is of substantially the same construction as the upper buffer pads but, as shown in Fig. 6, it is shaped or formed at its ends to conform to the curvature of and receive the tops of the vehicle fenders. In other words, the lower edges of the brace pads 33 are cut out, as indicated at 34, and the tops of the vehicle fenders engage in these cut out areas. The brace pads are placed in position on the vehicle fenders with the faces of these pads against the body of the vehicle and the pads are then secured in place by securing or locking links 35 which are bolted at one end to the brace beams 26 and have their other ends bolted to the beam 33, as shown in Fig. 2. By this means, the vehicle is firmly held in position when the cradle is oscillated through an arc of substantially 90°, as hereinafter stated.

At one side of the frame structure there is provided a platform 36 supported on suitable legs 37 at such an elevation that when the cradle 20 is rocked through substantially 90° so that it will be disposed on its side, the lower side of the cradle will be substantially in the plane of the platform. Thus it will be easy for mechanics, while standing on the platform, to repair underneath parts of the vehicle carried by the cradle.

At one end of the platform structure a suitable stairway 38 is provided to enable mechanics to easily reach the platform.

The oscillation of the cradle to the desired side position is effected through the medium of the structure shown in Fig. 1. This structure consists of a horizontally disposed cylinder 39 of suitable length carrying within it a piston 40 with which is connected a piston rod 41. The forward end of this piston rod is connected through the medium of a hinge joint 42 with a thrust link 43, the opposite end of the thrust link being pivotally attached, as at 44, to the adjacent side of the cradle preferably to the adjacent cradle track 27.

Connected with the end of the cylinder remote from the link 43 is a pipe line 45 which leads from a compressed air source 46. This line is equipped with the control valve 47. Any suitable means may be provided for supplying compressed air to the tank 46 such as a compressor unit indicated generally by the numeral 48 which is connected by the pipe 49 with the tank 46, as shown. The end of the operating or motor cylinder 39 remote from the thrust link is provided with an air relief valve 50.

In the operation of the present structure, it will be readily apparent that when the motor piston 40 is fully retracted in the cylinder, the vehicle supporting cradle will hang in the frame so that the ends of the tracks 27 will be alined with the approach and exit ramps 28—29. A vehicle may then be readily driven into the cradle and onto the tracks 27 so that it is suitably centrally disposed in the cradle between the fixed buffer pads 32. The brace pads 33 will then be placed in position so as to hold the vehicle against movement after which by operating the motor piston to move it forwardly, oscillatory movement will be transmitted through the thrust link 43 to swing the cradle to the side position in which it is shown in dotted outline in Fig. 1. It will be seen that the under-side of the vehicle will thus be readily accessible to mechanics standing upon the platform 36.

By the provision of the crane upon the tracks 7 on top of the frame, it will be readily apparent that when the motor vehicle is in position in the cradle, either end of the vehicle may be readily raised so that necessary operations may be carried out upon the front or rear end structure. It will be understood, of course, that when the crane is used to lift either end of the vehicle, the buffer and brace pads at the sides of the vehicle will be removed so that this lifting of the vehicle may be readily accomplished.

In order that the forward end of the piston rod and the adjacent end of the thrust link 43 may be firmly supported so as to obtain the desired upward thrust, which must be given to the cradle, there is provided at the joint 42 a downwardly extending arm 51 carrying at its lower end a supporting roller or foot roller 52. This roller may be supported upon a suitable track 53 extending transversely of the frame to the far side thereof from the cylinder so that the joint 42 will have firm support at all times.

As an additional means of insuring the safety of the motor vehicle in the cradle when the latter is oscillated, there are provided a pair of hook members 54 which are attached, as shown in Fig. 1, to the track rails 27, so that they may be engaged over the bumper of the motor vehicle or tracks. These hooks may be connected with the rails in any suitable manner which will facilitate their ready attachment to the vehicle bumper and the means here shown for connecting the hooks with the rails consists of a heavy spring 55 for each hook, one end of the spring being securely attached to the rail 27 and the other end being securely attached to the hook. It will be understood that these springs will be of such length that they will have to be stretched slightly in order to effect the connection of the hook with the car bumper and thus when the hook is released, the spring will pull the hooks firmly into engagement with the bumper and the hooks will then operate to prevent any longitudinal movement of the car on the tracks.

From the foregoing, it will be readily apparent that with the structure herein disclosed, motor vehicles may be conveniently handled for disposition in positions where mechanics may reach the underside of the vehicle for making repairs, without having to crawl under the vehicle or stand in pits while working thereon as it is necessary for them to do at the present time. It will also be apparent that the vehicle may be handled in a manner stated without danger of damaging the body in any way or marring the finish thereof.

What is claimed is:

1. In a structure of the character stated, an elongated frame-like structure constituting a supporting cradle for a vehicle having fenders, means supporting the cradle for rocking movement on an axis extending longitudinally of the cradle, a pair of longitudinally extending tracks forming a part of the cradle structure and spaced to receive the wheels of a motor vehicle, yieldable longitudinally extending bracing bodies on each side of the cradle for bracing the motor vehicle in the cradle structure against movement relative to the cradle, one of said bodies on each side of the cradle being formed to fit over the top curvature of a fender of the vehicle and power means for rocking the cradle structure on said axis to turn the supported vehicle to an on-its-side position.

2. A vehicle handling structure of the character stated, comprising an elongated frame having longitudinally spaced transverse bearing beams, an elongated frame disposed within the first frame between said bearing beams and having transversely extending top bearing beams, shafts connecting the bearing beams of the two frames whereby the second frame has swinging movement transversely of the first frame, a pair of tracks extending longitudinally of the lower portion of the second frame, a ramp at an end of the first frame leading to the adjacent ends of said tracks, means carried by and at the side of the second frame for bracing a motor vehicle supported on the tracks against movement relative to the supporting frame, said means including members formed to fit the curvature of the tops of the vehicle fenders to hold the vehicle against longitudinal movement and means for oscillating the second frame transversely of the first frame.

3. A vehicle handling means of the character described, comprising an elongated rectangular frame structure, means suspending said frame structure for oscillation on an axis extending longitudinally thereof, said frame structure including a lower portion on which a vehicle may be run, upper longitudinally extending side portions and oblique bracing beams extending downwardly from said upper side portions, a longitudinally extending pad supported upon each side of the frame by a pair of bracing beams, said pads being spaced apart to permit the interposition of a vehicle body therebetween, a removable pad extending longitudinally of the frame beneath each of said first pads and adapted to engage front and rear fenders of a vehicle, means for detachably coupling said lower pads with the adjacent bracing beams, and power means connected with the lower part of said frame for oscillating the same.

4. A vehicle handling means of the character described, comprising an elongated rectangular frame structure, means suspending said frame structure for oscillation on an axis extending longitudinally thereof, said frame structure including a lower portion on which a vehicle may be run, upper longitudinally extending side portions and oblique bracing beams extending downwardly from said upper side portions, a longitudinally extending pad supported upon each side of the frame by a pair of bracing beams said pads being spaced apart to permit the interposition of a vehicle body therebetween, a removable pad extending longitudinally of the frame beneath each of said first pads and adapted to engage front and rear fenders of a vehicle, means for detachably coupling said lower pads with the adjacent bracing beams, power means connected with the lower part of said frame for oscillating the same, said power means comprising a horizontally disposed piston cylinder, a piston in the cylinder having a rod extending therefrom toward the frame, means for actuating said piston in the cylinder, and a thrust link pivotally coupling said rod with said frame.

5. In a structure of the character stated, an elongated frame-like structure constituting a supporting cradle for a vehicle having fenders, means supporting the cradle for rocking movement on an axis extending longitudinally of the cradle, a pair of longitudinally extending tracks forming a part of the cradle structure and spaced to receive the wheels of a motor vehicle, a fixed longitudinally extending pad member carried by the cradle at each side, said pad members being spaced apart a distance to snugly receive between them the upper part of a motor vehicle when run onto said tracks, a pad member extending longitudinally of each side of the cradle at an elevation below the first pad, each of said lower pad members being detachably connected with the cradle, each of the lower pad members being formed to fit over the top curvatures of an adjacent pair of vehicle fenders, and means for effecting the rocking of the cradle structure on said axis to turn a supported vehicle to a desired position.

JAMES M. SHERROD.